A. C. AND N. JONASSEN.
RESILIENT TIRE.
APPLICATION FILED JAN. 30, 1919.
1,353,757.
Patented Sept. 21, 1920.
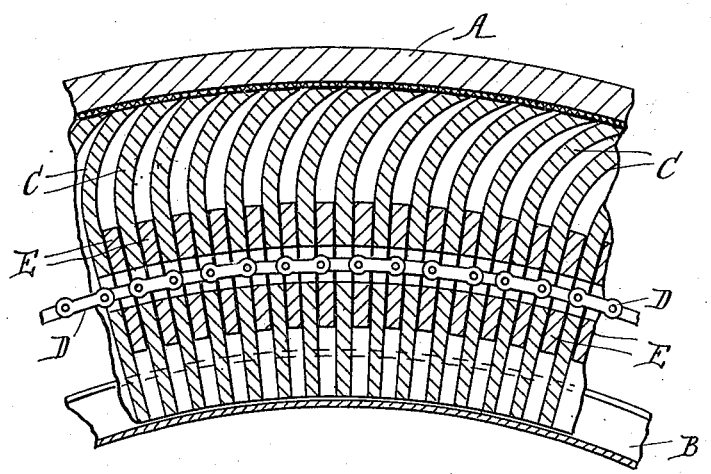
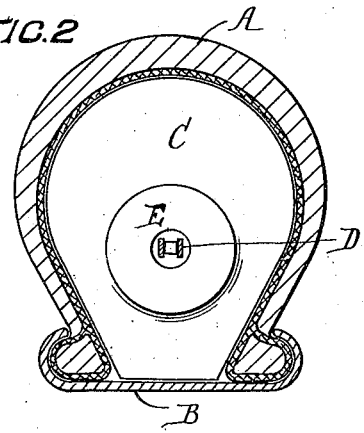
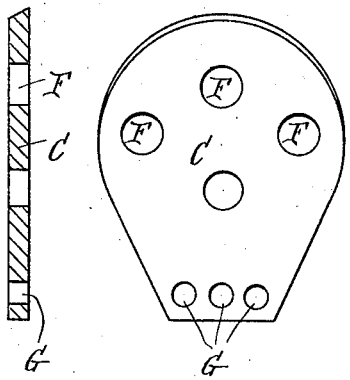
INVENTORS:
A. C. JONASSEN
NOAH JONASSEN
BY: *[signature]*
ATTORNEY.

UNITED STATES PATENT OFFICE.

ALFRED CHRISTIAN JONASSEN AND NOAH JONASSEN, OF WHAKATANE, NEW ZEALAND.

RESILIENT TIRE.

1,353,757.   Specification of Letters Patent.   Patented Sept. 21, 1920.

Application filed January 30, 1919. Serial No. 274,078.

*To all whom it may concern:*

Be it known that we, ALFRED CHRISTIAN JONASSEN and NOAH JONASSEN, subjects of the King of Great Britain, residing at Whakatane, in the Dominion of New Zealand, have invented a new and useful Improvement in Resilient Tires; and we do hereby declare the following to be a full, clear, and exact description of the same.

This invention relates to that class of resilient tire for motor vehicles, motor bicycles and other vehicles, in which a cover of rubber or of combined canvas and rubber is fitted to the wheel rim and incloses a resilient body or core formed by layers or disks of fabric or rubber or combined fabric and rubber materials, arranged radially to the wheel center and strung upon a chain or wire threaded through them.

The invention consists in improvements in the construction of such a class of body or core for the tire, by means of which are provided facilities for assembling the parts, or for the replacement of worn or damaged parts by new ones, and also an effective resiliency for the tire and one that may be readily varied at will.

In describing the invention reference will be made to the accompanying sheet of drawings, in which:—

Figure 1 is a longitudinal sectional view of a portion of a complete tire constructed in accordance with this invention.

Fig. 2 is a cross section thereof.

Fig. 3 is a face view, and

Fig. 4 is a longitudinal section of a modified form of the disks or leaves.

An ordinary type of more or less flexible cover A, made of suitable materials, is held within a rim B on the wheel in any suitable manner, as for instance by the construction of the cover and rim of the " clencher " type shown in the drawings.

The resilient body or core of the tire is made up of a number of disks or leaves C of a suitably stiff resilient material, such as a mixture of canvas and rubber, leather, rubber or the like material. The size and shape of the leaves is such that the cover when clenched to the rim of the wheel, causes the leaves to overlap each other and to be under compression. The leaves are strung on an endless chain or wire band D, which extends through a hole in each leaf. The leaves are preferably spaced from one another by spacing disks or washers E made of suitable stiff material, such as leather or fabric. Each of the washers has a hole through which the chain or wire also extends.

When the core is placed on the rim and the cover is placed thereover and clenched to the rim, the outer end of each leaf will be bent over the spacing disk or washer E while the remaining portion extends in a line radial to the wheel. All the leaves are thus made to incline in the same circumferential direction and in a direction opposite to the direction of rotation of the wheel, so that the end of one will overlap the end of the next as shown in Fig. 1. If desired the outer edge of each leaf may be beveled as shown in Fig. 4 in order that when thus inclined backwardly, it will present a broad surface to contact with the inner surface of the shoe or cover.

The inclination of the leaves or disks in the manner described will produce a resilient springy cushion for the tire cover, the nature of the material and the rigidity obtained by the interposed washers insuring of the cover being kept fully distended under normal running circumstances.

The number and positions of the spacing disks or washers will be varied to provide for varying resiliency, the greatest resiliency being obtained by arranging the washers alternately with the leaves or disks or by arranging the washers in pairs in some instances, while greater strength and less resiliency is obtained by increasing the number of leaves or disks between each two washers.

Likewise the resiliency may be further increased by modifying the leaves C shown in Figs. 1 and 2 by forming each leaf or disk with apertures F in its area, as shown in Figs. 3 and 4, such being varied in size, number and positions to obtain different effects.

When the core members are intended to rest at their inner edges upon the rim, in the manner shown in the drawings, the transverse compressibility thereof so as to allow for the cover being placed in the rim, may be insured by forming them with rows of apertures G (Fig. 3) near such edges.

We claim:—

1. A resilient tire for wheels comprising, a flexible cover adapted to be clenched to a wheel rim; a plurality of stiff resilient leaves radially disposed within said cover, the size and shape of said leaves being such that said cover when clenched to the rim causes the leaves to overlap each other and be under compression; a plurality of spacing disks interposed between said leaves; and an endless metallic band concentric with said cover and adapted to pass through apertures in the leaves and disks.

2. A resilient tire for wheels comprising, a flexible cover adapted to be clenched to a wheel rim; a plurality of stiff resilient leaves radially disposed within said cover, the size and shape of said leaves being such that said cover when clenched to the rim causes the leaves to overlap each other and be under compression; a plurality of spacing disks interposed between said leaves; and an endless metallic band concentric with said cover and adapted to pass through apertures in the leaves and disks, said leaves having apertures therein, for the purpose of increasing the compressibility of the leaves.

3. A resilient tire for wheels, comprising a shoe; a plurality of resilient leaves adapted to contact directly with and bear against the shoe and having a base adapted to contact directly with and bear against the rim of the wheel to which it is to be attached, said leaves being of such size and shape as to be under compression between the shoe and rim when the shoe is clenched to the rim.

4. A resilient filling for a hollow shoe for vehicle wheels, comprising a plurality of resilient leaves the size and shape of which is such that the cover when attached to the wheel causes the leaves to overlap and be under compression; a plurality of spacing disks interposed between the leaves; and a flexible circumferential metallic band adapted to pass through apertures in the leaves and disks to hold the same together before and during the operation of placing the filling within a shoe.

In testimony whereof we have signed this specification in the presence of two subscribing witnesses.

ALFRED CHRISTIAN JONASSEN.
NOAH JONASSEN.

Witnesses:
  E. A. SUCKLINE,
  D. C. CHALMERS.